United States Patent [19]
Takato et al.

[11] Patent Number: 5,347,577
[45] Date of Patent: Sep. 13, 1994

[54] BATTERY FEED CIRCUIT FOR SUPPLYING FEED CURRENT TO TELEPHONE SET

[75] Inventors: Kenji Takato; Kazuhiro Yoshida, both of Kawasaki; Kazuyuki Minohara, Yokohama, all of Japan

[73] Assignee: Fujitsu Limited, Kawasaki, Japan

[21] Appl. No.: 939,913

[22] Filed: Sep. 3, 1992

[30] Foreign Application Priority Data

Sep. 5, 1991 [JP] Japan .................. 3-226002

[51] Int. Cl.$^5$ ........................... H04M 19/00
[52] U.S. Cl. .................... 379/413; 379/399; 379/324; 379/405
[58] Field of Search ............... 379/413, 324, 323, 399, 379/405

[56] References Cited

U.S. PATENT DOCUMENTS

| | | | |
|---|---|---|---|
| 4,476,350 | 10/1984 | Aull et al. ........................ | 379/413 X |
| 4,872,199 | 10/1989 | Kawami et al. ................... | 379/413 |
| 4,935,960 | 6/1990 | Takato et al. .................... | 379/324 X |
| 4,982,422 | 1/1991 | Itoh et al. ........................ | 379/324 |

FOREIGN PATENT DOCUMENTS 8707104 11/1987 European Pat. Off. ............. 379/413

Primary Examiner—James L. Dwyer
Assistant Examiner—Paul Fournier
Attorney, Agent, or Firm—Armstrong, Westerman, Hattori, McLeland & Naughton

[57] ABSTRACT

A battery feed circuit supplies a feed current to a telephone set via a 2-wire telecommunication line formed of a TIP line and a RING line. The battery feed circuit includes a first voltage detection circuit for detecting a first voltage across the TIP line and a ground line, a second voltage detection circuit for detecting a second voltage across the RING line and a power line connected to a power supply of the battery feed circuit, a current source responsive to a first control signal for respectively generating first and second currents in the TIP and RING lines, the first and second currents being equal in magnitude and opposite in direction, the current source also varying the first and second currents in response to a second control signal so as to be in proportion to a common mode voltage across the TIP and RING lines, a first feedback circuit responsive to the first and second voltages detected by the first and second voltage detection circuits for generating the first control signal, and a second feedback circuit for generating the second control signal by detecting the common mode voltage across the TIP and RING lines.

10 Claims, 9 Drawing Sheets

FIG. I (PRIOR ART)

BATTERY FEED CIRCUIT FOR SUPPLYING FEED CURRENT TO TELEPHONE SET

BACKGROUND OF THE INVENTION (1) Field of the invention

The present invention generally relates to a battery feed circuit, and more particularly to a battery feed circuit for supplying a feed current to a telephone set via a subscriber line.

(2) Description of related art

A battery feed circuit supplies a feed current to a telephone set via a 2-wire telecommunication line (a subscriber line). In a conventional battery feed circuit, a passive circuit having coils has been used. Further, due to development of electronic circuits, a battery feed circuit using an electronic circuit has been proposed recently.

A conventional battery feed circuit using a electronic circuit is shown in FIG. 1. This conventional battery feed circuit is disclosed in U.S. Pat. No. 4,476,350.

Referring to FIG. 1, a feed current is supplied to a telephone set 1 via a 2-wire telecommunication line formed of a TIP line and a RING line. The TIP line is connected to a hi-directional constant-current source U5 and the RING line is connected to a bi-directional constant-current source U6. A structure of each of the bi-directional constant-current sources U5 and U6 is disclosed, for example, in "IEEE Journal of Solid-State Circuits, Vol. SC-16, No. 4 August 1981, High Voltage IC for a Transformerless Trunk and Subscriber line Interface". The hi-directional constant-current sources U5 and U6 supply the current respectively to the TIP line and the RING line. The bi-directional constant-current sources U5 and U6 carry out complementary operations, so that, for example, a current output from the hi-directional constant-current source U5 passes through the TIP line, the telephone set 1 and the RING line and is absorbed into the bi-directional constant-current source U6. A voltage VTR across the TIP line and the RING line is supplied to a differential amplifier U1. The differential amplifier U1 detects the voltage VTR between the TIP line and the RING line. Circuit constants in the differential amplifier U1 are set to predetermined values so that the output of the differential amplifier U1 has a value of $$VTR \times a (a<1).$$

The output of the differential amplifier U1 is supplied to an inverting amplifier U2 formed of an operational amplifier, a resistor R1 and a feedback resistor R2. A point between the resistors R1 and R2 is connected with a constant-current source I1. The current output of the constant-current source I1 is set to a value so that the TIP line and the RING line are biased at constant voltages respectively against a ground and a power source VBB when no feed current is supplied to the telephone set in a state where the telephone set is on the hook (on-hook state). A current passing through the resistor R1 is equal to a value of $VTR \times a/R1$ (hereinafter R1 indicates both the resistor and a resistance thereof). A current i1 output from the constant-current source I1 is subtracted from the above current ($VTR \times a/R1$), and a current obtained by the subtraction passes through tile feed back resistor R2 of the inverting amplifier U2, so that the inverting amplifier U2 outputs a voltage Vo. In this case, the following formula stands.

$$[(VTR \times a/R1) - i1] \times R2 = -Vo$$

Thus, the output voltage Vo of the inverting amplifier U2 is denoted by the following formula (1).

$$Vo = -[(VTR \times a/R1) - i1] \times R2 \quad (1)$$

The output voltage Vo is supplied to a base of a transistor Q31 in a differential amplifier U8 via a low pass filter LP. The differential amplifier U8 outputs a first current and a second current respectively via transistors Q31 and Q32. The first and second currents are respectively supplied to amplifiers U3 and U4. When the voltage Vo supplied to the differential amplifier U8 is equal to zero (vo=0), the first and second currents are equal to each other and each of the currents is I2/2. When the voltage Vo is not equal to zero (Vo≠0), the first current is $[(I2/2)-(Vo/2R3)]$ and the second current is $[(I2/2)+(Vo/2R4)]$. The amplifiers U3 and U4 convert the input currents into voltages, and voltages output from the amplifiers U3 and U4 are respectively supplied to the bi-directional constant-current sources U5 and U6. A differential voltage between the outputs of the amplifiers U3 and U4 is in proportion to the voltage Vo and a phase of the differential voltage differs from that of the voltage Vo by 180°. Thus, the bi-directional constant-current sources U5 and U6 output currents respectively in proportion to (−Vo/R3) and (+Vo/R4). That is, the hi-directional constant-current sources U5 and U6 carry out complementary operations so that the feed current is supplied to the telephone set 1 via the TIP line and the RING line.

In the circuit shown in FIG. 1, the current i1 from the constant-current source i1 corresponds to the output voltage VBB of the power supply. From the above formula (1), it is understood that the output voltage Vo of the inverting amplifier U2 corresponds to (VBB VTR). VTR). The outputs of both the amplifiers U3 and U4 are not symmetrical about the value of VBB/2, but feedback operations of a common mode signal detecting circuit U7 are strongly applied to the hi-directional constant-current sources U5 and U6 so that the output of the common mode signal detecting circuit U7 cancels the current I2. As a result, the voltages of the TIP line and the RING line are balanced.

In the conventional battery feed circuit described above, the feed current supplied to the telephone set 1 is controlled based on the differential voltage VTR across the TIP line and the RING line. That is, the differential voltage VTR is detected and converted into a current, and then the feed current supplied to the telephone set 1 is controlled based on the voltage Vo corresponding to the current obtained by subtracting the current i1 from the above current obtained based on the differential voltage VTR. As the feed current supplied to the telephone set 1 is controlled based on the differential voltage VTR across the TIP line and the RING line, even if the output voltage VBB (e.g. −48V) of the power supply varies, the feed current supplied to the telephone set 1 via the TIP line and the RING line is maintained at a constant value. However, when the output voltage VBB of the power supply varies, a voltage VRB across the RING line and a power line (VBB) of the power supply, and a voltage VTG across the TIP line and the ground line (0v) vary. Thus, when the output voltage VBB of the power supply decreases, a dynamic range on each of the TIP line and the RING line also decreases. As a result, in a case where line resistances of the TIP line and the RING line are large (the telephone set 1 is located away from the battery feed circuit), there is a possibility that transistors in the battery feed circuit are saturated and voice signals received and transmitted to and from the telephone set 1 via the TIP line and the RING line are distorted.

SUMMARY OF THE INVENTION

Accordingly, a general object of the present invention is to provide a novel and useful battery feed circuit in which the disadvantages of the aforementioned prior art are eliminated.

A more specific object of the present invention is to provide a battery feed circuit in which various characteristics required therefor, such as a constant resistance feed current characteristic, a feed current limitation characteristic, a high differential mode impedance characteristic, and a low common mode impedance characteristic can be stably obtained without decreasing the dynamic range on each of the TIP line and the RING line.

The above objects of the present invention are achieved by a battery feed circuit for supplying a feed current to a telephone set via a 2-wire telecommunication line formed of a first line and a second line, the battery feed circuit comprising: first voltage detection means for detecting a first voltage across the first line and a ground line having an electric potential of zero; second voltage detection means for detecting a second voltage across the second line and a power line connected to a power supply of the battery feed circuit; current source means responsive to a first control signal for respectively generating first and second currents in the first and second lines, the first and second currents being equal in magnitude and opposite in direction, the current source means also varying the first and second currents, in response to a second control signal, to cause them to be in proportion to a common mode voltage across the first and second lines; first feedback means responsive to the first and second voltages detected by the first and second voltage detection means for generating the first control signal; and second feedback means for generating the second control signal by detecting the common mode voltage across the first and second lines.

According to the present invention, as the feed current is controlled based on the first voltage across the first line and the ground line and the second voltage across the second line and the power line, the feed current can be stably supplied to the telephone set without deteriorating a dynamic range on each of the first (TIP) and second (RING) lines.

Another object of the present invention is to provide a battery feed circuit in which the telephone set can carry out an on-hook transmission operation with a small idling current.

The above objects of the present invention are achieved by a battery feed circuit further comprising control means for increasing a feed current resistance of the battery feed circuit N times when the telephone set is in an on-hook state where N is an integer; and bias means for supplying an idling current to the first and second lines, so that a bias voltage depending on the feed current resistance increased by the control means and the idling current supplied to the first and second lines by the bias means are applied across the first and second lines.

According to the present invention, as the current feed resistance of the battery feed circuit is increased N times, the on-hook transmission operation can be carried out while supplying only a small idling current to the first (TIP) and second (RING) lines.

Additional objects, features and advantages of the present invention will become apparent from the following detailed description when read in conjunction with the accompanying drawings.

DESCRIPTION OF THE PREFERRED EMBODIMENTS

A description will be given, with reference to FIG. 2, of the principle of a first embodiment of the present invention.

Figure 1:
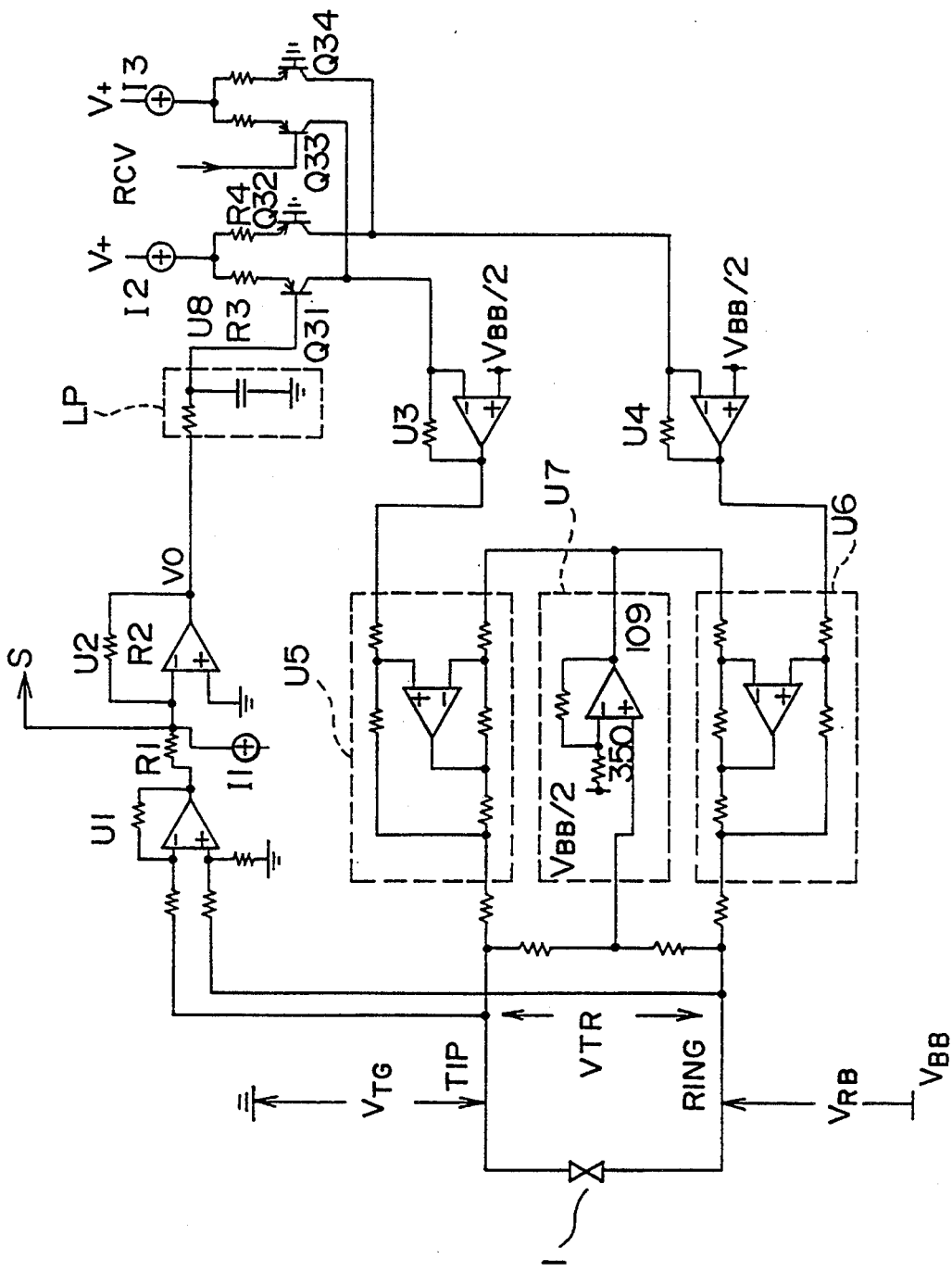
FIG. 1 is a circuit diagram illustrating a conventional battery feed circuit.
Figure 2:
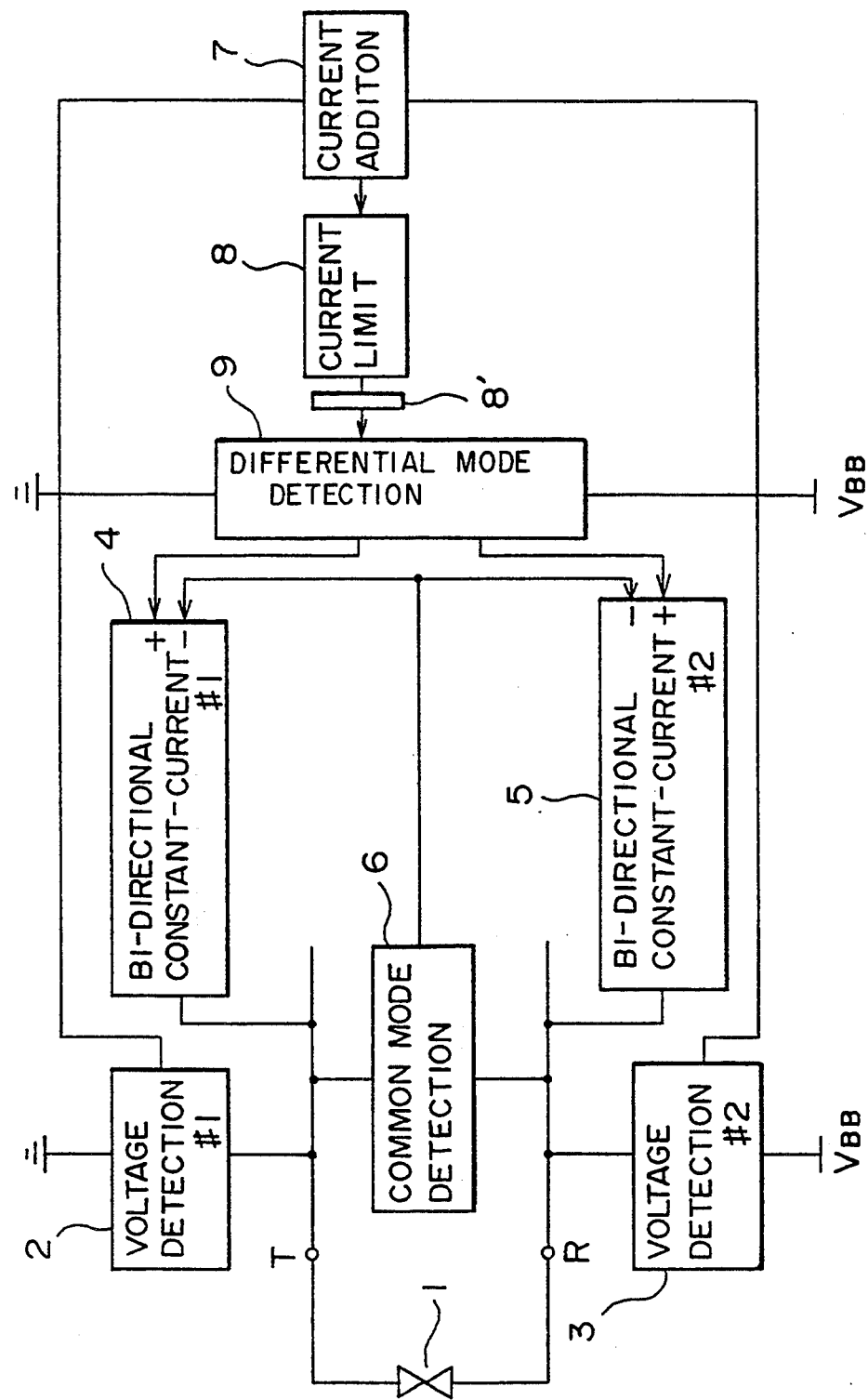
FIG. 2 is a block diagram illustrating a principle of a battery feed circuit according to a first embodiment of the present invention.

Referring to FIG. 2, a feed current is supplied to the telephone set 1 via the 2-wire telecommunication line formed of the TIP line and the RING line in the same manner as that in a case shown in FIG. 1. A first voltage detection circuit 2 detects a voltage VTG across the TIP line and the ground line and outputs a first detecting current corresponding to the detected voltage. A second voltage detection circuit 3 detects a voltage VRB across the RING line and the power line (VBB) of the power supply for this battery feed circuit and outputs a second detecting current corresponding to the detected voltage. The TIP line is connected with an output of a first bi-directional constant-current circuit 4. The RING line is connected with an output of a second bi-directional constant-current circuit 5. A common mode signal detection circuit 6 is coupled to the TIP line and the RING line and detects common mode signals on the TIP line and the RING line. An output of the common mode signal detection circuit 6 is supplied to common input terminals (−) of both the bi-directional constant-current circuits 4 and 5. The first detecting current output from the first voltage detection circuit 2 and the second detecting current output from the second voltage detection circuit 3 are supplied to a current addition circuit 7. The current addition circuit 7 superposes the first and second voltage detecting currents. An output current of the current addition circuit 7 is supplied to a differential voltage output circuit 9 via a current limit circuit 8 for limiting the current to a value less than a predetermined value and a low pass filter 8' for removing an AC component from the current. The differential voltage output circuit 9 is connected to the ground line and the power line (VBB) and outputs a pair of first and second differential voltages. The first differential voltage is greater than VBB/2 and the second differential voltage is less than VBB/2. Absolute differences between the first differential voltage and VBB/2, and between the second differential voltage and VBB/2 are equal to each other and depend on the output current of the current addition circuit 7. The first and second differential voltages from the differential voltage output circuit 9 are respectively supplied to terminals (+) of the first and second bi-directional constant-current circuits 4 and 5.

Figure 3:
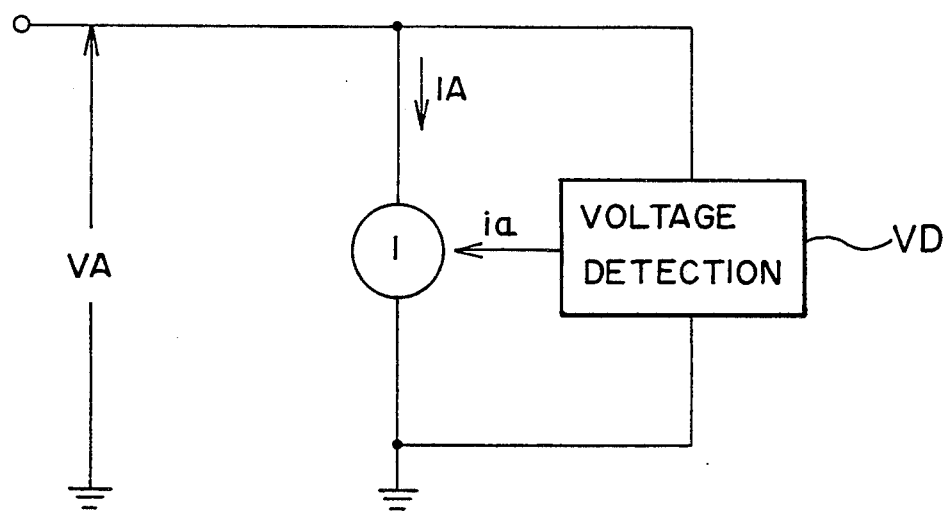
FIG. 3 is a diagram illustrating a basic circuit having a resistance characteristic.

In the above battery feed circuit, the voltages between the TIP line and the ground line and between the RING line and the power line (VBB) are detected by the first and the second voltage detection circuits 2 and 3. Then the feed current to be supplied to the telephone set 1 is controlled based on currents depending on the above voltages detected by the first and second voltage detection circuits 2 and 3. In this case, the battery feed circuit has a resistance characteristic. In an equivalent circuit of the battery feed circuit regarding either the TIP line or the RING line, shown in FIG. 3, when a voltage VA is supplied to a line, the voltage detection circuit VD detects the voltage VA on the line and outputs a detecting current ia having a value of one K-th (1/K) of a value of the detected voltage. A constant-current source I outputs a current IA having a value N times the value of the detecting current ia. The detecting current ia and the current IA output from the constant-current source I are respectively denoted by the following formulas.

$$ia = Va/K$$

$$IA = ia \times N = (VA/K) \times N$$

Here, Ra (=VA/IA) is an equivalent resistance and is denoted by the following formula.

$$Ra = VA/IA = Va/[(VA/K) \times N]$$

$$= K/N$$

That is, the equivalent resistance Ra is equal to a constant value K/N. Thus, the battery feed circuit has a constant resistance characteristic.

When the feed current supplied to the telephone increases, the current limit circuit 8 limits the feed current to a value less than a predetermined value. As the bi-directional constant-current circuits 4 and 5 are constant-current sources, the battery feed circuit operates at a high output impedance with respect to differential mode signals on the TIP line and the RING line. The common mode signal detection circuit 6 detects a voltage at a node between the TIP line and the RING line and the detected voltage is fed back to the common terminals (−) of both the hi-directional constant-current circuits 4 and 5, so that the output currents of the bi-directional constant-current circuits 4 and 5 are controlled so as to be in proportion to the magnitude of the common mode signal. As a result, the battery feed circuit operates at a low impedance with respect to common mode signals on the TIP line and RING line.

A description will now be given, with reference to FIGS. 4, 5A, 5B and 6, of a first embodiment of the present invention.

Figure 4:
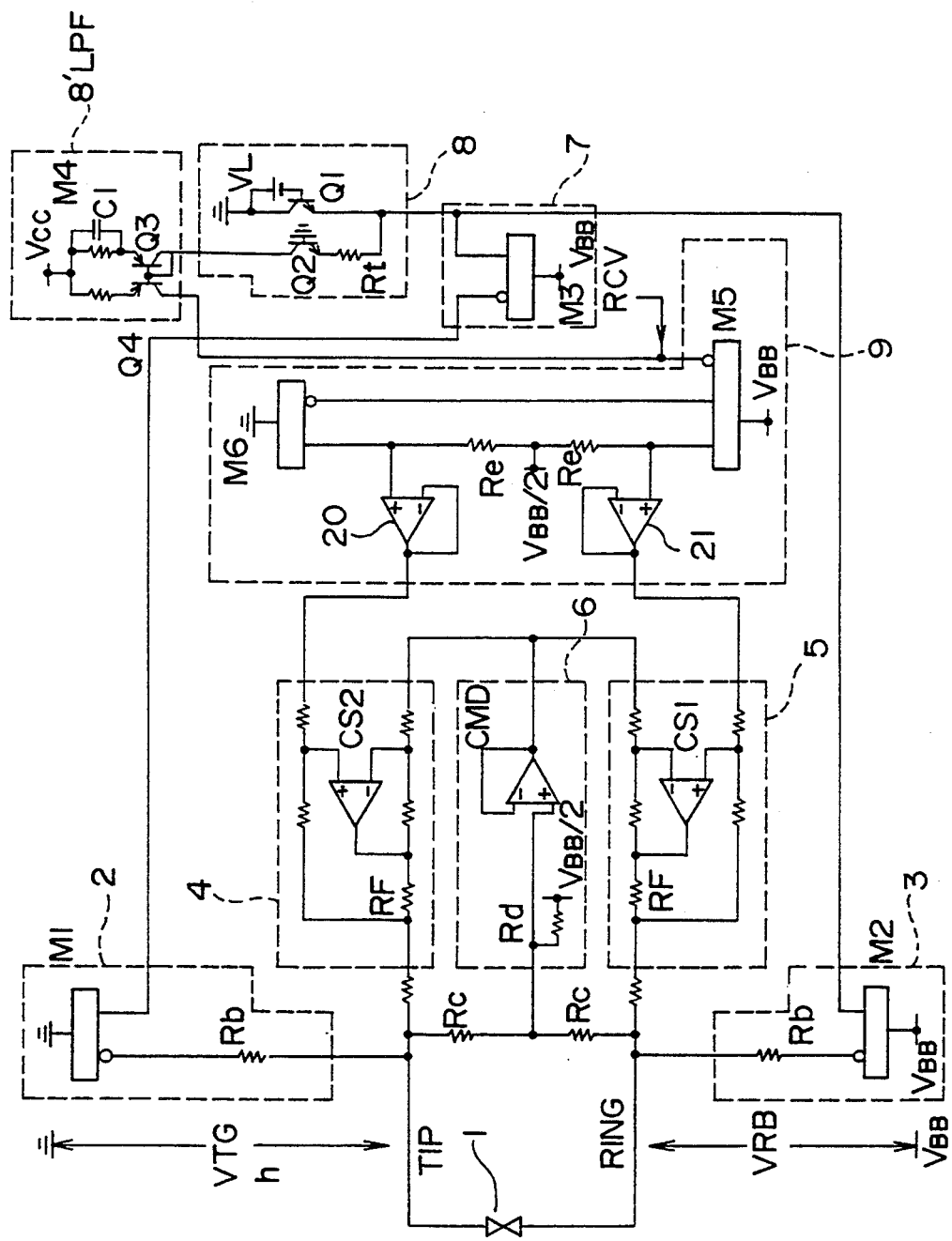
FIG. 4 is a circuit diagram illustrating a battery feed circuit according to the first embodiment of the present invention.

Referring to FIG. 4, which shows a circuit structure of a battery feed circuit according to the first embodiment of the present invention, the battery feed circuit comprises the first and second detection circuits 2 and 3, the first and second bi-directional constant-current circuits 4 and 5, the common signal detection circuit 6, the current addition circuit 7, the current limit circuit 8, the low pass filter 8' and the differential voltage output circuit 9, in the same manner as that shown in FIG. 2.

Each of the first and second bi-directional constant-current circuits 4 and 5 is formed of a transconductance amplifier. The transconductance amplifier outputs a current in proportion to an input voltage regardless of an electric potential on a line (the TIP line or the RING line) connected therewith. Thus, an output impedance of the transconductance amplifier is very high. The common mode signal detection circuit 6 has a pair of resistors Rc respectively connected to the TIP line and the RING line and a resistor Rd connected between VBB/2 and a node between the resistors Rc. Due to the pair of resistors Rc and the resistor Rd, the common mode signal detection circuit 6 detects a voltage at the node between the resistors Rc. The voltage detected at the node between the resistors Rc corresponds to a common mode signal. The common mode signal detection circuit 6 outputs a voltage depending on the detected voltage. The output voltage of the common mode signal detection circuit 6 is supplied to the negative input terminals of both the bi-directional constant-current circuits 4 and 5. Thus, a common mode impedance in each of the TIP line and the RING line is small. The common mode impedance depends on a ratio of the resistors Rc to Rd and a voltage to current conversion ratio of the transconductance amplifier. The common mode impedance is approximately equal, for example, to 50 ohms. The common mode impedance can be freely changed by variation of values of the resistors Rc, Rd and transconductances of the bi-directional constant-current circuits.

Figure 5A:
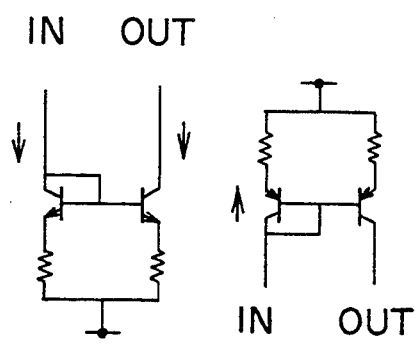
FIG. 5A is a circuit diagram illustrating mirror circuits.
Figure 5B:
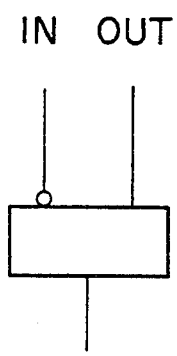
FIG. 5B is a diagram illustrating a symbol of the mirror circuit.

The first voltage detection circuit 2 comprises a mirror circuit M1 and a resistor Rb. The resistor Rb is connected to the TIP line and an input terminal of the mirror circuit M1. In general, a mirror circuit is constructed of transistors and resistors as shown in FIG. 5A and indicated by a symbol shown in FIG. 5B. The miror circuit outputs a current, from an output terminal, equal to an input current supplied to an input terminal. A current depending on the voltage VTG across the TIP line and the ground line is supplied via the resistor Rb to the input terminal of the mirror circuit M1 of the first voltage detection circuit 2. The mirror circuit M1 outputs a current equal to the input current, so that the first voltage detection circuit 2 outputs the current approximately in proportion to the voltage VTG. The second voltage detection circuit 3 comprises a mirror circuit M2 and a resistor Rb connected to the RING line and an input terminal of the mirror circuit M2. The second voltage detection circuit 3 outputs a current approximately in proportion to the voltage VRB across the RING line and the power line (VBB), in the same manner as the first voltage detection circuit 2. The output currents of the first and second voltage detection circuits 2 and 3 are supplied to the current addition circuit 7.

The current addition circuit 7 has a mirror circuit M3. The current output from the first voltage detection circuit 2 is supplied to an input terminal of the mirror circuit M3 and the current output from the second voltage detection circuit 3 is supplied to an output terminal of the mirror circuit M3, so that the currents output from the first and second voltage detection circuits 2 and 3 are superposed on each other at the output terminal of the mirror circuit M3.

The current from the output terminal of the mirror circuit M3 of the current addition circuit 7 is supplied to the current limit circuit 8. The current limit circuit 8 comprises transistors Q1 and Q2, a resistor Rt and a reference voltage supply VL. Base-emitter voltages VBE of both the transistors Q1 and Q2 are approximately equal to each other. A collector of the transistor Q1 is connected to the ground line and the reference voltage supply V1 is provided between a collector and a base of the transistor Q1. A base of the transistor Q2 is connected to the ground line, and an emitter of the transistor Q2 is connected via the resistor Rt to an emitter of the transistor Q1. An output current of the current limit circuit 8 is supplied from a collector of the transistor Q2 to the low pass filter 8'.

In the current limit circuit 8, when a voltage drop VRt caused by the input current passing through the resistor Rt is less than the reference voltage VL, the transistor is in an off-state and all the input current passes through the transistor Q2. That is, the input current is supplied, as it is, to the low pass filter 8'. On the other hand, when the voltage drop VRt exceeds the reference voltage VL, only an amount of current corresponding to the reference voltage VL supplied via the transistor Q2 to the low pass filter 8' and an amount of current corresponding to a difference between the voltage drop VRt and the reference voltage VL passes through the transistor Q1. That is, the current limit circuit 8 limits the current to be supplied to the low pass filter to a value equal to or less than a value corresponding to the reference voltage VL.

The low pass filter 8' is constituted of a mirror circuit M4 having transistors Q3 and Q4, resistors and a capacitor C1. The current supplied from the current limit circuit 8 is inverted by the transistors Q3 and Q4 and an AC component in the current is removed by the capacitor C1 therefrom. Thus, only a DC component of the current is output from the transistor Q4. The current output from the transistor Q4 of the low pass filter 8' is supplied to the differential voltage detection circuit 9.

The differential voltage detection circuit 9 comprises mirror circuits M5 and M6, first and second resistors Re and buffer amplifiers 20 and 21. The current supplied from the current addition circuit 7 via the current limit circuit 8 and the low pass filter 8' to the differential voltage output circuit 9 is input to an input terminal of the mirror circuit M5. The mirror circuit M5 has first and second output terminals. An output current from the first output terminal of the mirror circuit M5 is supplied to an input terminal of the mirror circuit M6.

An output current from an output terminal of the mirror circuit M6 is supplied to the first resistor Re connected to VBB/2. An output current from the second terminal of the mirror circuit M5 is supplied to the second resistor Re connected to VBB/2. A voltage generated at the first resistor Re is supplied to the first bi-directional constant-current circuit 4 via the buffer amplifier 20. A voltage generated at the second resistor Re is supplied to the second bi-directional constant-current circuit 5 via the buffer amplifier 21. Magnitudes of the voltages generated at the first and second resistors Re are equal to each other, and polarities of these voltages are opposite to each other. Each of the voltages generated at the first and second resistors Re is in proportion to a voltage (VTG+VBR).

Figure 6:
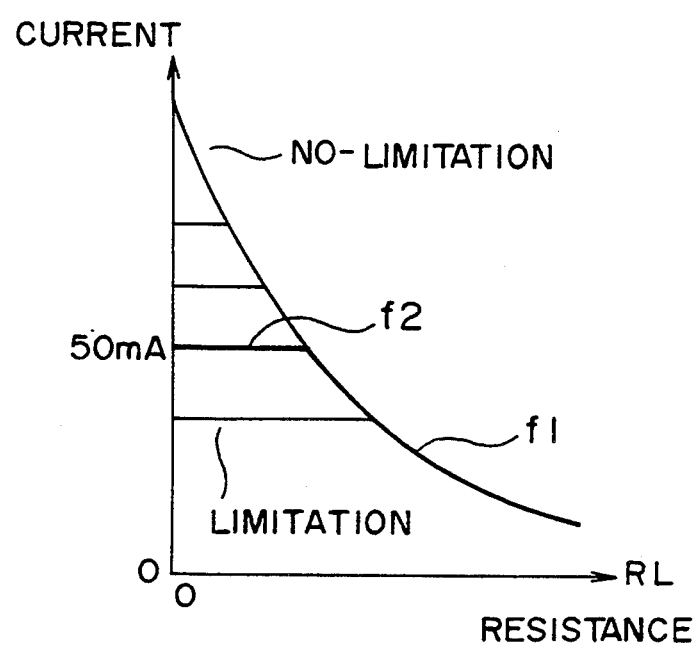
FIG. 6 is a graph illustrating a feed current characteristic obtained in the battery feed circuit shown in FIG. 4.

The first and second bi-directional constant-current circuits 4 and 5 supply the feed current to the telephone set 1 in accordance with a characteristic shown in FIG. 6. In FIG. 6, a horizontal-axis corresponds to a line resistance and a longitudinal-axis corresponds to a feed current supplied to the telephone set 1. A curve f1 indicates the resistance characteristic, and a curve f2 indicates the current limit characteristics. According to the current limit characteristic indicated by the curve f2, the feed current to be supplied to the telephone set 1 is limited to a limit current of 50 mA. This limit current depends on the resistor Rt and the reference voltage VL in the current limit circuit 8.

According to the first embodiment, the feed current is controlled based on the voltages VTG and VRG respectively between the TIP line and ground line and between the RING line and the power line (VBB) without the differential voltage across the TIP line and the RING line. Thus, if the power voltage VBB on the power line decreases, the feed current to be supplied to the telephone set 1 decreases. As a result, the voltages VTG and VRB vary almost not at all, and the dynamic range on the TIP line and the RING line does not decrease.

Figure 7:
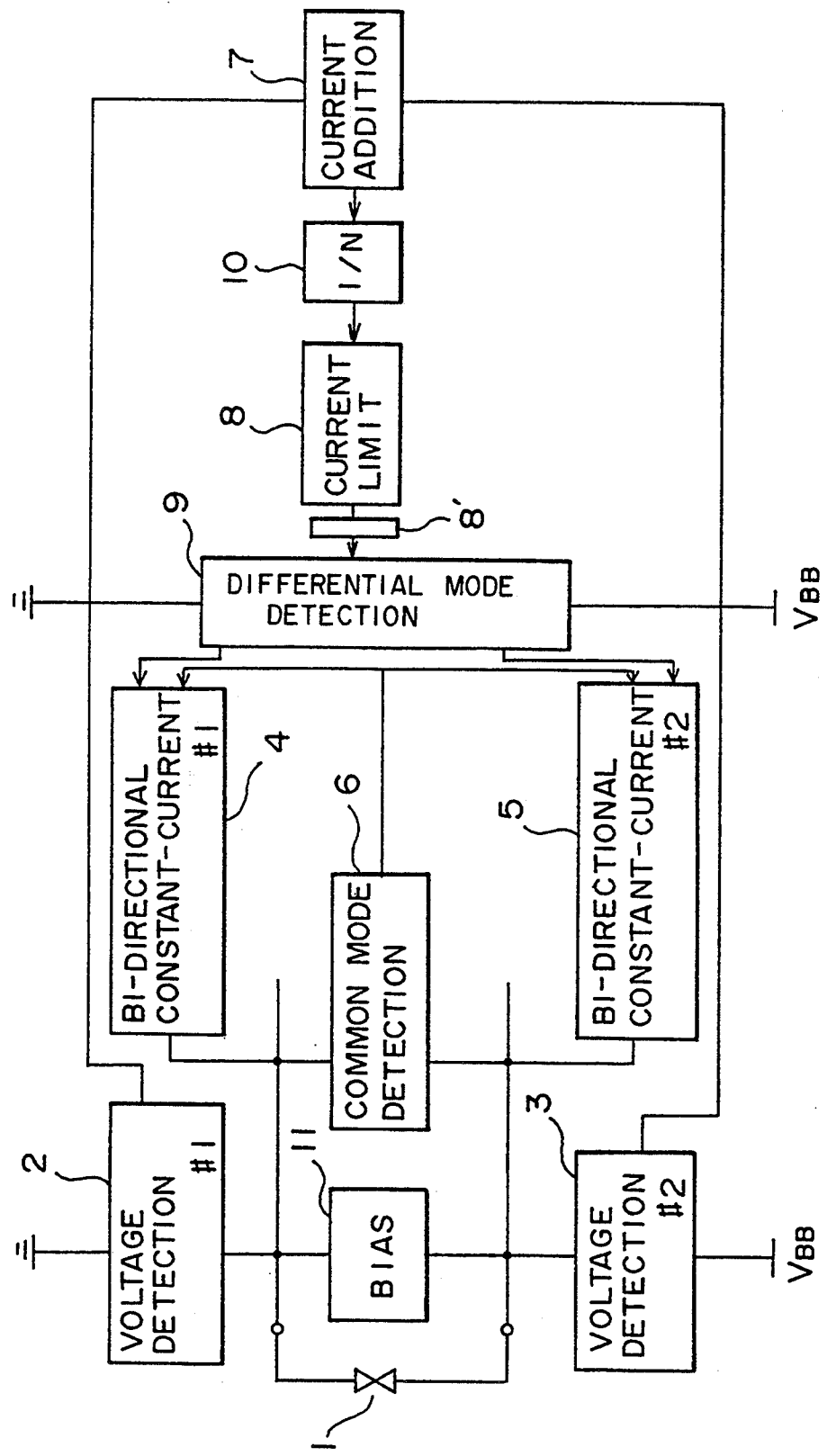
FIG. 7 is a block diagram illustrating a principle of a battery feed circuit according to a second embodiment of the present invention.

A description will now be given of the principle of a second embodiment of the present invention with reference to FIG. 7. In FIG. 7, those parts which are the same as those shown in FIG. 2 are given the same reference numbers.

Referring to FIG. 7, a battery feed circuit according to the second embodiment has the first and second voltage detection circuits 2 and 3, the first and second bi-directional constant current circuits 4 and 5, the common mode signal detection circuit 6, the current addition circuit 7, the current limit circuit 8, the low pass filter 8' and the differential voltage output circuit 9, in the same manner as that of the first embodiment shown in FIG. 2. The battery feed circuit of the second embodiment further comprises a 1/N circuit 10 provided between the current addition circuit 7 and the current limit circuit 8 and a bias circuit 11 provided between the TIP line and the RING line. The 1/N circuit 10 divides the current output from the current addition circuit 7 by N. That is, the 1/N circuit 10 outputs a current one N-th of the current output from the current addition circuit 7. The bias circuit 11 applies a bias voltage across the TIP line and the RING line in a state where the telephone set 1 is in an on-hook condition. Due to the bias voltage, an idling current passes through the TIP line and RING line.

In the second embodiment, the battery feed circuit operates in accordance with the same characteristics as in the above first embodiment, in the normal state. Further, according to the battery feed circuit of the second embodiment, the telephone set 1 can carry out an on-hook transmission operation. The on-hook transmission operation is defined as an operation in which signals equivalent to voice signals are transmitted from the subscriber circuit to remote subscriber stations with the telephone set 1 in the on-hook state. That is, when the telephone set 1 is in the on-hook state, the TIP line and the RING line are biased by the bias circuit 11. Due to the biasing of the TIP line and the RING line, the on-hook transmission operation can be carried out. The output current from the current addition circuit 7 is divided by N by the 1/N circuit 10, so that the equivalent resistance of this battery feed circuit increases N times. Thus, even if the idling current supplied from the bias circuit 11 to the TIP line and the RING line is small, the necessary bias voltage can be applied across the TIP line and the RING line.

A description will now be given, with reference to FIGS. 8, 9A, 9B, 10 and 11, of the second embodiment of the present invention.

Figure 8:
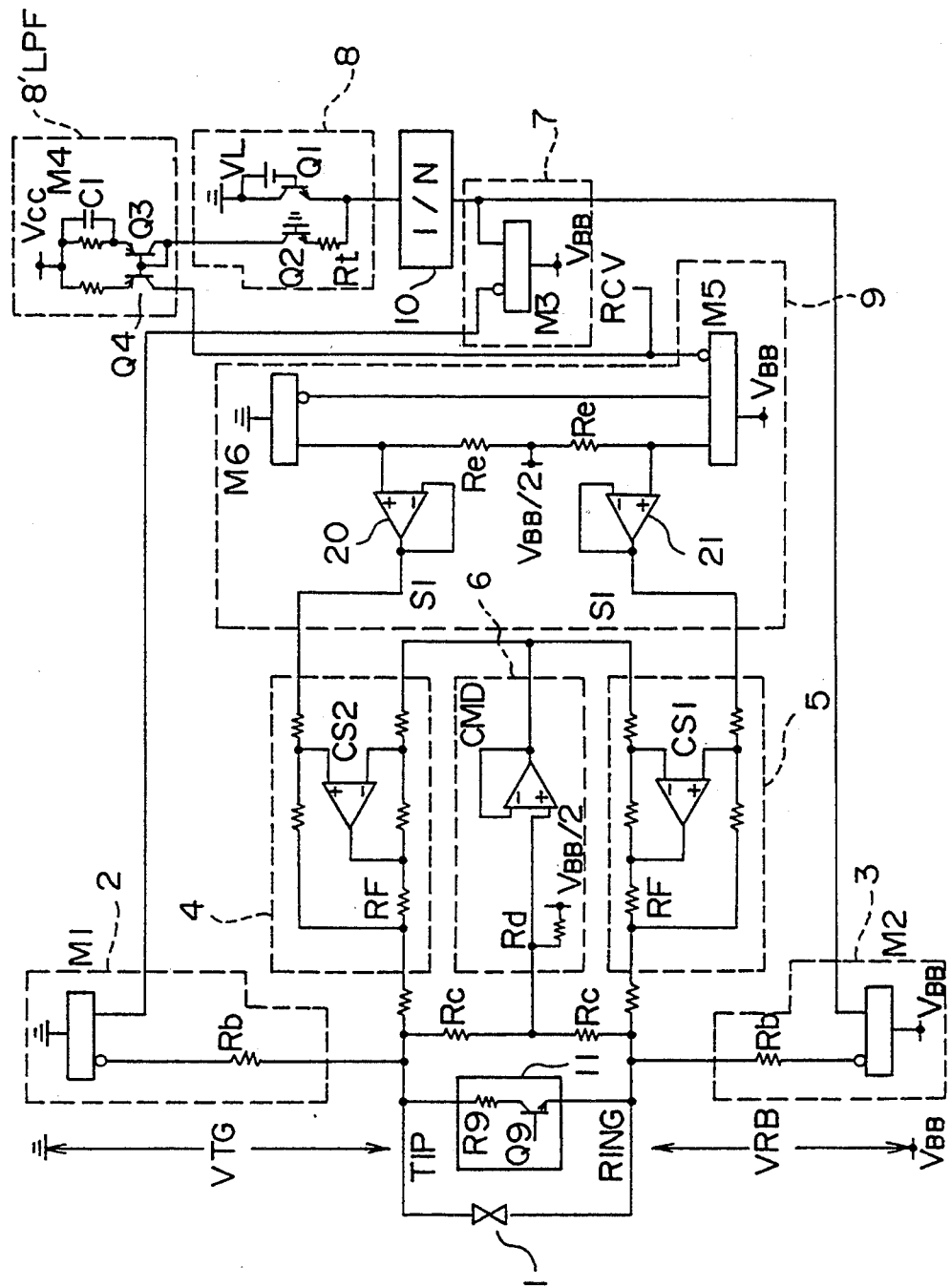
FIG. 8 is circuit diagram illustrating a battery feed circuit according to the second embodiment of the present invention.

FIG. 8 shows a circuit structure of a battery feed circuit according to the second embodiment of the present invention. In FIG. 8 those parts which are the same as those shown in FIG. 4 are given the same reference numbers.

Referring to FIG. 8, the battery feed circuit comprises the first and second voltage detection circuits 2 and 3, the first and second hi-directional constant-current circuit 4 and 5, the common mode signal detection circuit 6, the current addition circuit 7, the current limit circuit 8, the low pass filter 8' and the differential mode signal detection circuit 9. The 1/N circuit 10 is provided between the current addition circuit 7 and the current limit circuit 8, so that the current output from the current addition circuit 7 is divided by N and a current one N-th of the current output from the current addition circuit 7 is supplied to the current limit circuit 8. The bias circuit 11 is connected to the TIP line and the RING line so that an idling current is supplied from the bias circuit 11 to the TIP line and the RING line when the telephone set 1 is in the on-hook state.

Figure 9A:
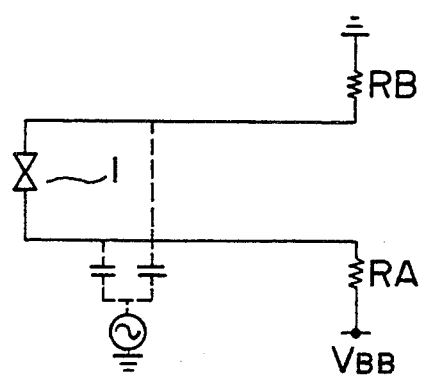
FIG. 9A and 9B are circuit diagrams illustrating equivalent circuits of the battery feed circuit shown in FIG. 8 when an on-hook transmission operation is carried out.

In the on-hook transmission operation, an equivalent circuit of the battery feed circuit is shown in FIG. 9A. In FIG. 9A, feed current resistances are indicated by RA and RB. As no current passes through the TIP line and the RING line in the on-hook state, voltages are not generated at the feed current resistors RA and RB. The feed current resistors RA and RB are generally formed of electronic circuits, a predetermined bias voltage being required to transmit signals from the feed current resistors RA and RB, it is thus necessary to supply a predetermined current (an idling current) to the TIP line and the RING line. In FIG. 9A, an inductive coupling of an AC power supply with respect to the 2-wire telecommunication line (the TIP line and the RING line) is shown. As shown in FIG. 9A, supplying an induced voltage to the line in the common mode is referred to as an AC induction. Under a standard such as LSSGR, an amount of current cased by the AC induction is 12 mA (a peak value) in each of the TIP and RING lines. Thus, in a case where a battery feed circuit equivalently indicated by the current feed resistors RA and RB can make pass a current in one direction, an idling current greater than 12 mA (e.g. 15 mA) has to be supplied to the TIP line and RING line.

Figure 9B:
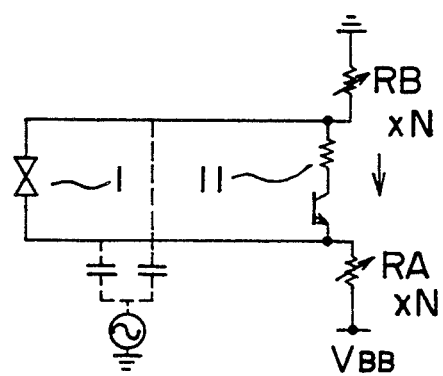

In the second embodiment of the present invention, as the battery feed circuit comprises the bi-directional constant-current circuits 4 and 5, the idling current can decrease so long as the bias voltage is maintained at a predetermined value. That is, as shown in FIG. 9B, even if the idling current decreases one N-th (e.g. 1/5), the necessary bias voltage can be obtained by increasing the feed current resistances RA and RB N times (e.g. 5 times). In this case, the common impedance is set at a value (e.g. 50 ohms) less than a value (e.g. 200 ohms) of the DC impedance, and the bias voltage is ensured for a voltage drop caused by the AC induced current of 12 mA and signals in the on-hook transmission operation.

A control of the feed current resistance will be described below with reference to FIG. 10.

Figure 10:
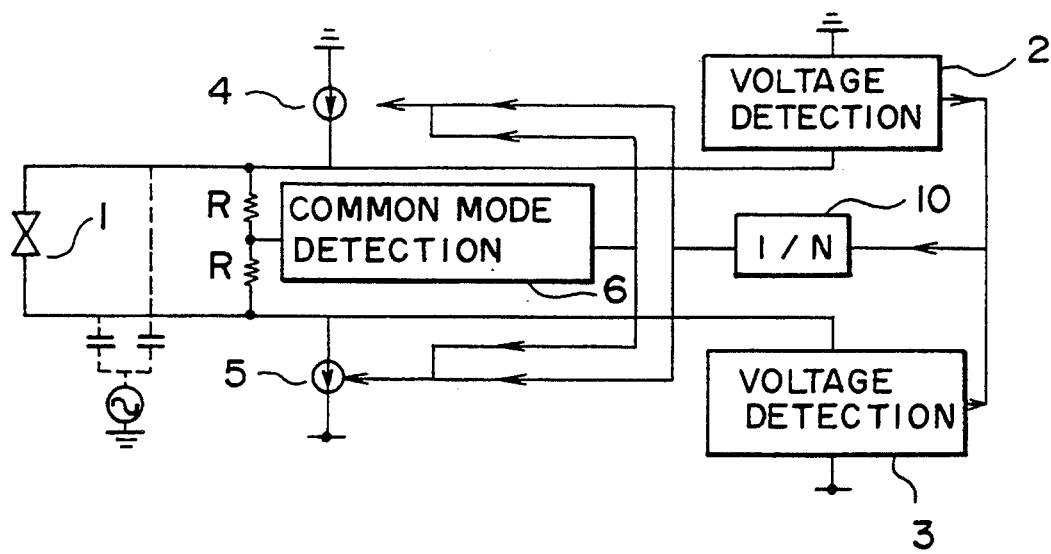
FIG. 10 is a circuit diagram illustrating an equivalent circuit of the battery feed circuit shown in FIG. 8.

Referring to FIG. 10, the battery feed circuit includes the first and second hi-directional constant-current circuits 4 and 5. The common mode signal detection circuit 6 detects a common mode impedance at a node between resistors R respectively connected to the TIP line and the RING line. The detected common mode impedance is fed back to the bi-directional constant-current circuits 4 and 5. Further, output currents from the voltage detection circuits 2 and 3 are added to each other, the 1/N circuit 10 divides the result obtained by addition of the currents by N and outputs a 1/N current. Then, the 1/N current output from the 1/N circuit 10 is fed back to the bi-directional constant-current circuits 4 and 5.

In a normal state, N is set to 1 (N=1) in the 1/N circuit 10 and the feed current resistance is approximately 200 ohms. In the on-hook transmission operation, N is set to 5 (N=5) in the 1/N circuit 10 and the feed current resistance is approximately 1000 (=200×5) ohms. Thus, in the on-hook transmission operation, even if the idling current of 3 mA is supplied to the TIP line and the RING line, the bias voltage having a value corresponding to a current of 15 mA is ensured.

The battery feed circuit shown in FIG. 8 operates in the same manner as the equivalent circuit shown in FIG. 10. Signals RCV to be transmitted to remote stations are input to this battery feed circuit via the differential mode signals detection circuit 9. In the normal state, the battery feed circuit shown in FIG. 8 supplies the feed current to the telephone set 1 in the same manner as that shown in FIG. 4.

Figure 11:
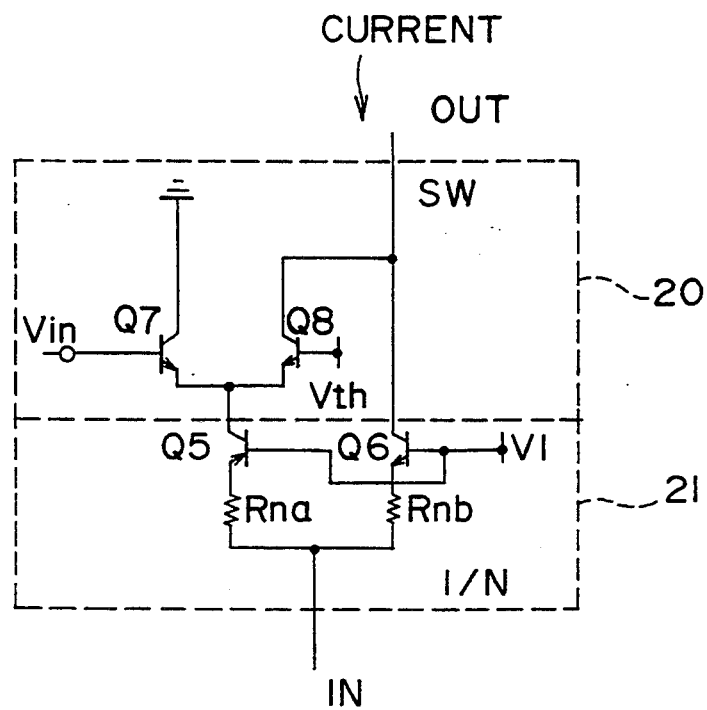
FIG. 11 is a circuit diagram illustrating a 1/N circuit provided in the battery feed circuit shown in FIG. 8.

The 1/N circuit 10 is formed as shown, for example, in FIG. 11.

Referring to FIG. 11, the 1/N circuit 10 comprises a switching part 20 (SW) having transistors Q7 and Q8 and a dividing part 21 (1/N) having transistors Q5 and Q6 and resistors Rna and Rnb. A control signal Vin is supplied to the transistor Q7 of the switching part 20. When a level of the control signal Vin is greater than a predetermined threshold level Vth (Vin>Vth), the transistor Q7 is turned on and the transistor Q8 is turned off. When the level of the control signal Vin is less than the threshold level Vth (Vin<Vth), the transistor Q7 is turned off and the transistor Q8 is turned on. The transistors Q5 and Q6 and the resistors Rna and Rnb in the dividing part 21 form a mirror circuit. The resistances Rna and Rnb are set so that the following equation of proportionality is satisfied.

$$Rna: Rnb = 1:N-1$$

Thus, proportionality of currents respectively passing through the transistors Q5 and Q6 is equal to N−1:1. When the transistor Q8 in the switching part 20 is turned on, both the currents in the transistors Q5 and Q6 are output from the 1/N circuit 10. On the other hand, when the transistor Q8 is turned off, all the current in the transistor Q5 is supplied to the transistor Q7 in the switching part 20 and only the current in the transistor Q6 is output from the 1/N circuit 10. Thus, in this case, the 1/N current is output from the 1/N circuit 10. That is, in the normal state, the control signal Vin having the level less than the threshold level Vth is supplied to the switching part 20. In the on-hook transmission operation, the control signal Vin having the level greater than the threshold level Vth is supplied to the switching part 20.

According to the second embodiment, in the on-hook transmission operation, the 1/N circuit 10 decreases to one N-th the current to be fed back to the bi-directional constant-current circuits 4 and 5. Thus, an idling current required for the on-hook transmission operation can be decreased.

The present invention is not limited to the aforementioned embodiments, and variations and modifications may be made without departing from the scope of the claimed invention.

What is claimed is:

1. A battery feed circuit for supplying a feed current to a telephone set via a 2-wire telecommunication line formed of a first line and a second line, said battery feed circuit comprising:

first voltage detection means for detecting a first voltage across said first line and a ground line having an electric potential of zero and for outputting a first output current corresponding to said first voltage;

second voltage detection means for detecting a second voltage across said second line and a power line connected to a power supply of said battery feed circuit and for outputting a second output current corresponding to said second voltage;

current source means responsive to a first control signal for respectively generating first and second currents in said first and second lines, said first and second currents in said first and second lines being equal in magnitude and opposite in direction, said current source means also varying said first and second currents in said first and second lines in response to a common mode voltage across said first and second lines;

first feedback means responsive to the first and second voltages detected by said first and second voltage detection means for generating said first control signal, said first feedback means comprising current addition means for adding said first current from said first voltage detection means and said second current from said second voltage detection means to each other, and current limit means for limiting a current obtained by said current addition means so as to not exceed a predetermined value, said first feedback means generating said first control signal based on a current obtained by said current limit means; and second feedback means for generating said second control signal by detecting the common mode voltage across said first and second lines.

2. A battery feed circuit as claimed in claim 1, wherein said current source means comprises a first bi-directional constant-current circuit for supplying said first current to said first line in response to said first control signal and a second bi-directional constant-current circuit for supplying said second current to said second line in response to said first control signal.

3. A battery feed circuit as claimed in claim 1, wherein said first voltage detection means has a mirror circuit having an input terminal and an output terminal and a resistor provided between said input terminal of said mirror circuit and said first line, said mirror circuit outputting said first current from said output terminal.

4. A battery feed circuit as claimed in claim 1, wherein said second voltage detection means has a mirror circuit having an input terminal and an output terminal and a resistor provided between said input terminal of said mirror circuit and said second line, said mirror circuit outputting said second current from said output terminal.

5. A battery feed circuit as claimed in claim 1, wherein said current addition means has a mirror circuit having an input terminal and an output terminal, said first current being supplied to said input terminal of said mirror circuit and said second current being supplied to said output terminal of said mirror circuit, and wherein said first control signal is generated based on a current obtained at said output terminal of said mirror circuit.

6. A battery feed circuit as claimed in claim 1, wherein said current limit means has a first transistor and a second transistor, a resistor provided between emitters of said first and second transistors, and a reference voltage supply provided between a base and a collector of said first transistor, the current obtained by said current limit means being supplied to the emitter of said first transistor, and the current obtained by said current limit means being output from a collector of said second transistor.

7. A battery feed circuit as claimed in claim 2, wherein said first control signal generated by said first feedback means is formed of a first signal and a second signal, said first and second signals being complimentary to each other and respectively being supplied to said first and second hi-directional constant-current circuits.

8. A battery feed circuit as claimed in claim 1, further comprising:

control means for increasing a feed current resistance of said battery feed circuit N times when said telephone set is in an on-hook state where N is an integer; and bias means for supplying an idling current to said first and second lines, so that a bias voltage depending on the feed current resistance increased by said control means and said idling current supplied to said first and second lines by said bias means is applied across said first and second lines.

9. A battery feed circuit as claimed in claim 8, wherein said control means has dividing means for diving the current obtained by said current addition means by N and for outputting a 1/N current, said first feedback means generating said first control signal based on said 1/N current obtained by said dividing means when said telephone set is in the on-hook state.

10. A battery feed circuit as claimed in claim 9, wherein said dividing means comprises first means for dividing the current obtained by said current addition means into a first amount and a second amount, and second means for outputting only the first amount of current when said telephone set is in the on-hook state, a proportionality of said first amount to said second amount being 1: N−1.

* * * * *